US005705795A

United States Patent [19]

Anderson et al.

[11] Patent Number: 5,705,795

[45] Date of Patent: Jan. 6, 1998

[54] GAP FILLING FOR THERMOPLASTIC WELDS

[75] Inventors: Robert C. Anderson; Stephen Christensen, both of Issaquah; Todd R. Peterson, Federal Way, all of Wash.

[73] Assignee: The Boeing Company, Seattle, Wash.

[21] Appl. No.: 467,509

[22] Filed: Jun. 6, 1995

[51] Int. Cl.[6] .............. H05B 6/10

[52] U.S. Cl. .............. 219/633; 219/634; 219/759; 156/274.4; 156/380.2

[58] Field of Search .............. 219/633, 634, 219/618, 647, 649, 759, 656, 670; 156/272.4, 272.2, 379.8, 380.2, 380.5

[56] References Cited

U.S. PATENT DOCUMENTS 2,241,312 5/1941 Luty .
2,273,423 2/1942 Somes .
2,372,920 4/1945 Blessing .
2,378,801 6/1945 Sidell et al. .
2,423,922 7/1947 Arndt, Jr. .
2,589,777 3/1952 Collins .
2,739,829 3/1956 Pedlow et al. .
2,761,941 9/1956 Ardichvili .
2,898,435 8/1959 Crafts .
3,061,503 10/1962 Gould et al. .
3,101,403 8/1963 Lewis et al. .
3,183,460 5/1965 Bennon .
3,288,979 11/1966 Mills et al. .
3,395,261 7/1968 Leatherman et al. .
3,427,421 2/1969 Matheson et al. .
3,431,379 3/1969 Yrene .
3,450,856 6/1969 Buck et al. .
3,492,453 1/1970 Hurst .
3,507,735 4/1970 Chisholm .
3,574,031 4/1971 Heller, Jr. et al. .
3,845,268 10/1974 Sindt .
3,864,186 2/1975 Balla .
3,941,643 3/1976 Balla .
3,946,349 3/1976 Haldeman, III .
3,996,402 12/1976 Sindt .
4,005,302 1/1977 Graf et al. .
4,029,837 6/1977 Leatherman .
4,029,926 6/1977 Austin .
4,091,254 5/1978 Struve .
4,120,712 10/1978 Sindt .
4,180,717 12/1979 Lenk et al. .
4,288,673 9/1981 Ishibashi .
4,296,295 10/1981 Kiuchi .
4,304,975 12/1981 Lenk et al. .
4,313,777 2/1982 Buckley et al. .
4,343,982 8/1982 Schwartz et al. .
4,355,222 10/1982 Geithman et al. .
4,382,113 5/1983 Schwartz et al. .
4,416,713 11/1983 Brooks .
4,421,588 12/1983 Davies .
4,445,951 5/1984 Lind et al. .

(List continued on next page.)

FOREIGN PATENT DOCUMENTS 0 461 979 4/1984 European Pat. Off. .
54-25542 2/1979 Japan .

*Primary Examiner*—Tu B. Hoang
*Attorney, Agent, or Firm*—John C. Hammar

[57] ABSTRACT

Thermoplastic welding is an emerging technology targeted at significantly reducing the cast of manufacture of aerospace structure by eliminating fasteners and the touch labor associated with fasteners to prepare, install, and inspect the assemblies. Thermoplastic welds, however, suffer from significant residual tensile strain caused by differences in the coefficient of thermal expansion between the carbon fiber reinforced composite laminates and the unreinforced weld. Holding fiber reinforcement to the weld using a structural susceptor which is a laminate of alternating layers of thermoplastic resin and fiber reinforcement sandwiching a conventional metal susceptor alleviates this strain. The structural susceptor can be peeled in selected locations to fill the gap between the laminates, eliminating costly profilometry of the faying surfaces and the associated problem of resin depletion where machining occurred to match the faying surfaces. The peeled susceptor is complementary in contour to the gap it will fill.

8 Claims, 3 Drawing Sheets

102
104
100
104
102

U.S. PATENT DOCUMENTS

| | | | |
|---|---|---|---|
| 4,489,123 | 12/1984 | Schijve et al. . | |
| 4,521,659 | 6/1985 | Buckley et al. . | |
| 4,653,396 | 3/1987 | Wennerberg . | |
| 4,671,470 | 6/1987 | Jonas . | |
| 4,673,450 | 6/1987 | Burke . | |
| 4,768,433 | 9/1988 | Boissevain . | |
| 4,791,260 | 12/1988 | Waldman . | |
| 4,822,972 | 4/1989 | Sugioka et al. . | |
| 4,897,518 | 1/1990 | Mucha et al. . | |
| 4,904,972 | 2/1990 | Mori et al. . | |
| 4,919,759 | 4/1990 | Ilmarinen et al. . | |
| 4,947,464 | 8/1990 | Mori et al. . | |
| 4,978,825 | 12/1990 | Schmidt et al. . | |
| 5,001,319 | 3/1991 | Holmstrom . | |
| 5,047,605 | 9/1991 | Ogden . | |
| 5,074,019 | 12/1991 | Link . | |
| 5,079,817 | 1/1992 | Anstotz et al. . | |
| 5,101,086 | 3/1992 | Dion et al. . | |
| 5,199,791 | 4/1993 | Kasanami et al. . | |
| 5,240,542 | 8/1993 | Miller et al. . | |
| 5,248,864 | 9/1993 | Kodokian . | |
| 5,250,776 | 10/1993 | Pfaffmann . | |
| 5,283,409 | 2/1994 | Brendel et al. . | |
| 5,313,034 | 5/1994 | Grimm et al. . | |
| 5,313,037 | 5/1994 | Hansen et al. . | |
| 5,500,511 | 3/1996 | Hansen et al. | 219/633 |
| 5,508,496 | 4/1996 | Hansen et al. | 219/633 |

FIG. 2
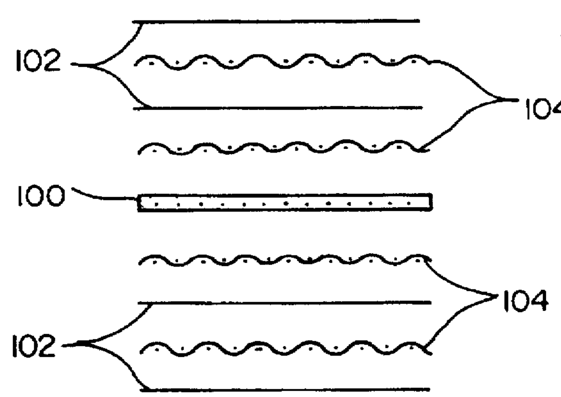
FIG. 3
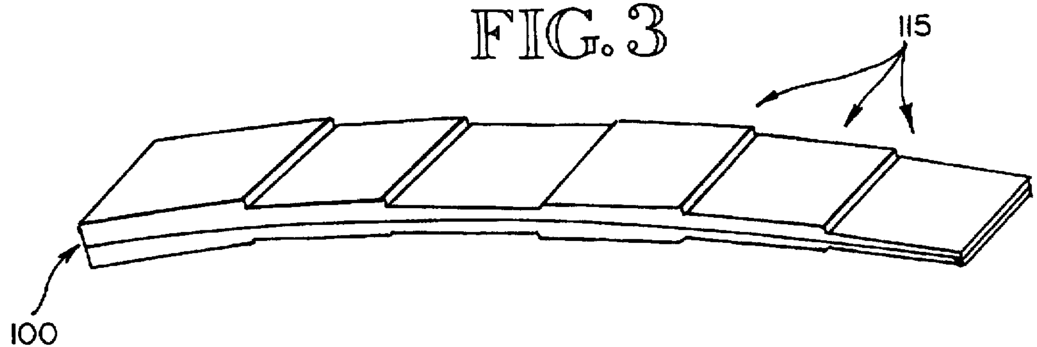
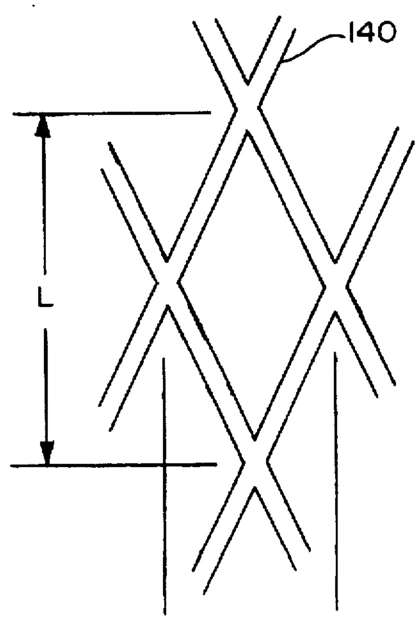
FIG. 4

GAP FILLING FOR THERMOPLASTIC WELDS

REFERENCE TO RELATED APPLICATIONS

The present invention is related to the following, copending, commonly-assigned U.S. Pat. No. 5,500,511 Tailored Susceptors for Induction Thermoplastic Welding, U.S. Pat No. 5,507,496 Selvaged Susceptor for Thermoplastic Welding by Induction Heating, and U.S. Pat. No. 5,486,684 Multipass Induction Heating for Thermoplastic Welding, all of which we incorporate by reference.

1. Technical Field

The present invention relates to gap filling thermoplastic welds to accommodate surface mismatches along the bondline.

2. Background Art

The exponential decay of the strength of magnetic fields dictates that, in induction welding processes, the structure susceptible to induction heating that is closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some case, destruction or denaturing of the resin. To avoid overheating of the outer plies and to insure adequate heating of the inner plies, a susceptor of significantly higher conductivity than the fibers is used to peak the heating selectively at the bond fine of the plies when heating from one side. An electromagnetic induction coil on one side of the assembly heats a susceptor to melt and cure a thermoplastic resin (also sometimes referred to as an adhesive) to bond the elements of the assembly together. Often the current density in the susceptor is higher at the edges of the susceptor than in the center because of the nonlinearity of the coil. This problem typically occurs when using a cup core induction coil like that described in U.S. Pat. No. 5,313,037 and can result in overheating the edges of the assembly or underheating the center, either condition leading to inferior welds because of nonuniform curing. It is necessary to have an open or mesh pattern in the susceptor to allow the resin to bond between the composite elements of the assembly when the resin heats and melts.

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding requires complicated surface pretreatments.

In contrast, thermoplastic welding, which eliminates fasteners, features the ability to join thermoplastic composite components at high speeds with minimum touch labor and little, if any, pretreatments. In our experience, the welding interlayer, called a susceptor, also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

There is a large stake in developing a successful induction welding process. Its advantages versus traditional composite joining methods are:

- reduced parts count versus fasteners
- minimal surface preparation, in most cases a simple solvent wipe to remove surface contaminants
- indefinite shelf life at room temperature
- short process cycle time, typically measured in minutes
- enhanced joint performance, especially hot/wet and fatigue
- permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Prior art disclosing thermoplastic welding with induction heating is illustrated by U.S. Pat. Nos. 3,966,402 and 4,120,712. In these patents, the metallic susceptors used are of a conventional type having a regular pattern of openings of traditional manufacture. Achieving a uniform, controllable temperature in the bondline, which is crucial to preparing a thermoplastic weld of adequate integrity to permit use of welding in aerospace primary structure, is difficult with those conventional susceptors, as we discussed and illustrated in our copending U.S. patent application Ser. No. 08/068,520, now abandoned.

Thermoplastic welding is a process for forming a fusion bond between two faying thermoplastic faces of two parts. A fusion bond is created when the thermoplastic on the surface of the two parts is heated to the melting or softening point and the two surfaces are brought into contact, so that the molten thermoplastic mixes, and the surfaces are held in contact while the thermoplastic cools below the softening temperature.

Simple as the thermoplastic welding process sounds, and easy as it is to perform in the laboratory on small pieces, it becomes difficult to perform reliably and repeatably in a real factory on full-scale pans to build a large structure such as an airplane wing box. The difficulty is in getting the proper amount of heat to the bondline without overheating the entire structure, and also in achieving intimate contact of the faying surfaces of the two parts at the bondline during heating and cooling despite the normal imperfections in the flatness of composite pans, thermal expansion of the thermoplastic during heating to the softening or melting temperature, flow of the thermoplastic out of the bondline under pressure, and then contraction of the thermoplastic in the bondline during cooling.

One technique for getting heat to the bondline in a thermoplastic assembly to be welded together is to include a conductive layer or article, known as a "susceptor", between the two surfaces to be welded, and to heat the susceptor by resistive heating so that the susceptor functions as a bondline heat source to melt or soften the thermoplastic at the bondline for fusion of the faying surfaces of the composite components to be joined. The electric current for heating the susceptor can be in the form of eddy currents generated inductively, as taught for example by U.S. Pat. Nos. 3,395,261 and 4,978,825, or it can be conducted directly to the susceptor through tabs or the like as shown in U.S. Pat. No. 5,313,037.

In U.S. patent application Ser. Nos. 08/286,360 and 08/068,520, we described a tailored susceptor for approaching the desired temperature uniformity. This susceptor relied upon carefully controlling the geometry of openings in the susceptor (both their orientation and their spacing) to distribute the heat evenly. For example, we suggested using a regular array of anisotropic, diamond shaped openings with a ratio of the length (L) to the width (W) greater than 1 to provide a superior weld over that achieved using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, we altered the current density in regions near the edges by increasing the foil density (i.e., the absolute amount of metal). Increasing the foil density along the edge of the susceptor increases the conductivity along the edge and reduces the current density and the edge heating. We increased foil density by folding the susceptor to form edge strips of double thickness or by compressing openings near the edge of an otherwise uniform susceptor. We found these susceptors difficult to reproduce reliably. Also, their use forced careful placement and alignment to achieve the desired effect.

The tailored susceptor for our earlier application was designed to use with the cup core of U.S. Pat. No. 5,313,037. With this coil, the magnetic field is strongest near the edges because the central pole creates a null at the center. Therefore, the susceptor is designed to counter the higher field at the edges by accommodating the induced current near the edges. The high longitudinal conductivity encourages induced currents to flow longitudinally.

Our selvaged susceptor for thermoplastic welding which is described in U.S. Pat. No. 5,508,496 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil, because, with that coil, it provides a controllable area of intense, uniform heating, a trailing region with essentially no heating, and a leading region with minor preheating.

The power (P) or power density which the susceptor dissipates as heat follows the well-known equation for power loss in a resistor: $P=(J^2)(R)$ wherein J is the eddy current (or its density) and R is the impedance (i.e., resistance) of any segment of the eddy path. The heating achieved directly corresponds to the power (or power density).

We achieve better performance (i.e., more uniform heating) in rib welding by using a selvaged susceptor having edge strips without openings. The resulting susceptor, then, has a center portion with a regular pattern of opening and solid foil edges, which we refer to as selvage edge strips. We embed the susceptor in a thermoplastic resin to make a susceptor/resin tape that is easy to handle and to use in performing the composite pieces prior to welding. Also, we have discovered that, with a selvaged susceptor, the impedance of the central portion should be anisotropic with a lower transverse impedance than the longitudinal impedance. Here, the L/W ratio of diamond shaped openings should be less than or equal to one. That is, unlike our tailored susceptor of U.S. Pat. No. 5,500,511, L for the selvaged susceptor should be less than W. With this new selvaged susceptor in the region immediately under the asymmetric induction work coil described in U.S. Pat. No. 5,444,220, we encourage the current to flow across the susceptor to the edges where the current density is lowest and the conductivity, highest.

Generally, we form the selvaged susceptor somewhat wider than normal so that the selvage edge strips are not in the bondline. We remove the selvage edge strips after forming the weld, leaving only a perforated susceptor foil in the weld. This foil has a relatively high open area fraction.

Significant effort has been expended in developing inductor and susceptor systems to optimize the heating of the bondline in the thermoplastic assemblies to be welded. Induction coil structures and tailored susceptors have now been developed that provide adequate control and uniformity of heating of the bondline, but a big hurdle remaining to perfecting the process to the point of practical utility for producing large scale aerospace-quality structures in a production environment is the aspect of the process dealing with the control of the surface contact of the faying surfaces of the two pans to be welded together, and the timing, intensity, and schedule of heat application so the material at the faying surfaces is brought to and maintained within the proper temperature range for the requisite amount of time for an adequate bond to form, and is maintained in intimate contact while the melted or softened material hardens in its bonded condition.

Large scale parts such as wing spars and ribs, and the wing skins that are bonded to the spars and ribs, are typically on the order of 20–30 feet long at present, and potentially can be hundreds of feet in length when the process is perfected for commercial transport aircraft. Parts of this magnitude are very difficult to produce with perfect flatness. Instead, the typical pan will have various combinations of surface deviations from perfect flatness, including large scale waviness in the direction of the major length dimension, twist about the longitudinal axis, dishing or sagging of "T" beam flanges, and small scale surface defects such as asperities and depressions. These irregularities interfere with full surface area contact between the faying surfaces of the two parts and actually result in surface contact only at a few "high points" across the intended bondline. Additional surface contact can be achieved by applying pressure to the pans to force the faying surfaces into contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "T" beam flanges to the softening point, so they begin to yield or sag under the application of the pressure needed to achieve a good bond.

Our multipass thermoplastic welding process described in U.S. patent application Ser. No. 5,486,684 enables a moving coil welding process to produce continuous or nearly continuous fusion bonds over the full area of the bondline to yield very high strength welds reliably, repeatably and with consistent quality. This process produces improved low cost, high strength composite assemblies of large scale parts, fusion bonded together with consistent quality, and uses a schedule of heat application that maintains the overall temperature of the structure within the limit in which it retains its high strength, so it requires no internal tooling to support the structure against sagging which otherwise could occur above the high strength temperature limit. The process also produces nearly complete bondline area fusion on standard production composite material parts having the usual surface imperfections and deviations from perfect flatness, while eliminating fasteners and the expense of drilling holes, inspecting the holes and the fasteners, inspecting the fasteners after installation, sealing between the parts and around the fastener and the holes; reducing mismatch of materials; and eliminating arcing from the fasteners.

In the process, an induction heating work coil is passed multiple times over a bondline while applying pressure in the region of the coil to the components to be welded, and maintaining the pressure until the resin hardens. The resin at the bondline is heated to the softening or melting temperature with each pass of the induction work coil and pressure is exerted to flow the softened/melted resin in the bondline and reduce the thickness of the bondline while improving the intimacy of the faying surface contact with each pass to militate for complete continuity of bond. The total time at the softened or melted condition of the thermoplastic in the faying surfaces is sufficient to attain deep inter diffusion of the polymer chains in the materials of the two faying surfaces throughout the entire length and area of the bondline, thereby producing a bondline of improved strength and integrity in the completed part, but the total time of the faying surfaces at softened temperature is in separate time segments which allows time for the heat in the interface to dissipate without raising the temperature of the entire structure to the degree at which it loses its strength and begins to sag, so the desired shape and size of the final assembly is maintained.

A structural susceptor allows the inclusion of fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin. Conventional susceptors are described U.S. Pat. Nos. 5,500,571 and 5,508,496. While the number of total plies in this structural susceptor is usually not critical, we prefer to use at least two plies of fiber reinforcement on each side of the susceptor.

SUMMARY OF THE INVENTION

The present invention relates to a method for gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which is too wide to create a quality weld using conventional susceptors.

We can easily tailor the thickness of the structural susceptor to match the measured gap by scoring through the appropriate number of plies of resin and fiber reinforcement and peeling them off. In doing so, a resin side layer will be on both faying surfaces and this layer should insure better performance from the weld.

BRIEF DESCRIPTION OF THE DRAWINGS

FIG. 2 is a schematic exploded sectional view of a typical structural susceptor of the present invention.

FIG. 3 is an illustrative perspective view of a structural susceptor profiled for filling a gap.

FIG. 4 is a detail view of a typical susceptor mesh.

DETAILED DESCRIPTION OF THE PREFERRED EMBODIMENT

First, we will describe a typical thermoplastic welding operation and then will describe the structural susceptor to alleviate residual tensile strain (and resulting cracking) in the weld and the method for gap filling by tailoring the structural susceptor to complement the profile of the laid up laminates.

For purposes of this description, "laminates" means a fiber-reinforced organic resin matrix composite having a plurality of plies of prepreg or its equivalent consolidated together and cured, as appropriate. The laminates are prefabricated by any appropriate means including automatic or hand type or tow fiber placement with autoclave consolidation and cure, resin transfer molding (RTM), or the like. Generally, the organic matrix resin is a thermoplastic, especially PEEK, ULTEM, or K3. In the welding operation, resin in the laminates as well as resin in the susceptor melts, intermixes, and fuses to form the weld. Nevertheless, the laminate might also be a thermoset in which case the welding process actually forms a hot melt adhesive bond rather than a weld. We prefer welding, but recognize the analogous process of adhesive bonding of thermosets.

In a thermoplastic laminate, the reinforcing fiber typically is carbon fiber in continuous or chopped form, and generally as tow or woven fabric. While other fibers can be used, modem aerospace requirements most often dictate carbon fibers for their strength and durability, and we prefer them. In thermosets, especially epoxy, the fibers might be graphite.

1. The Welding Operation

Figure 1:
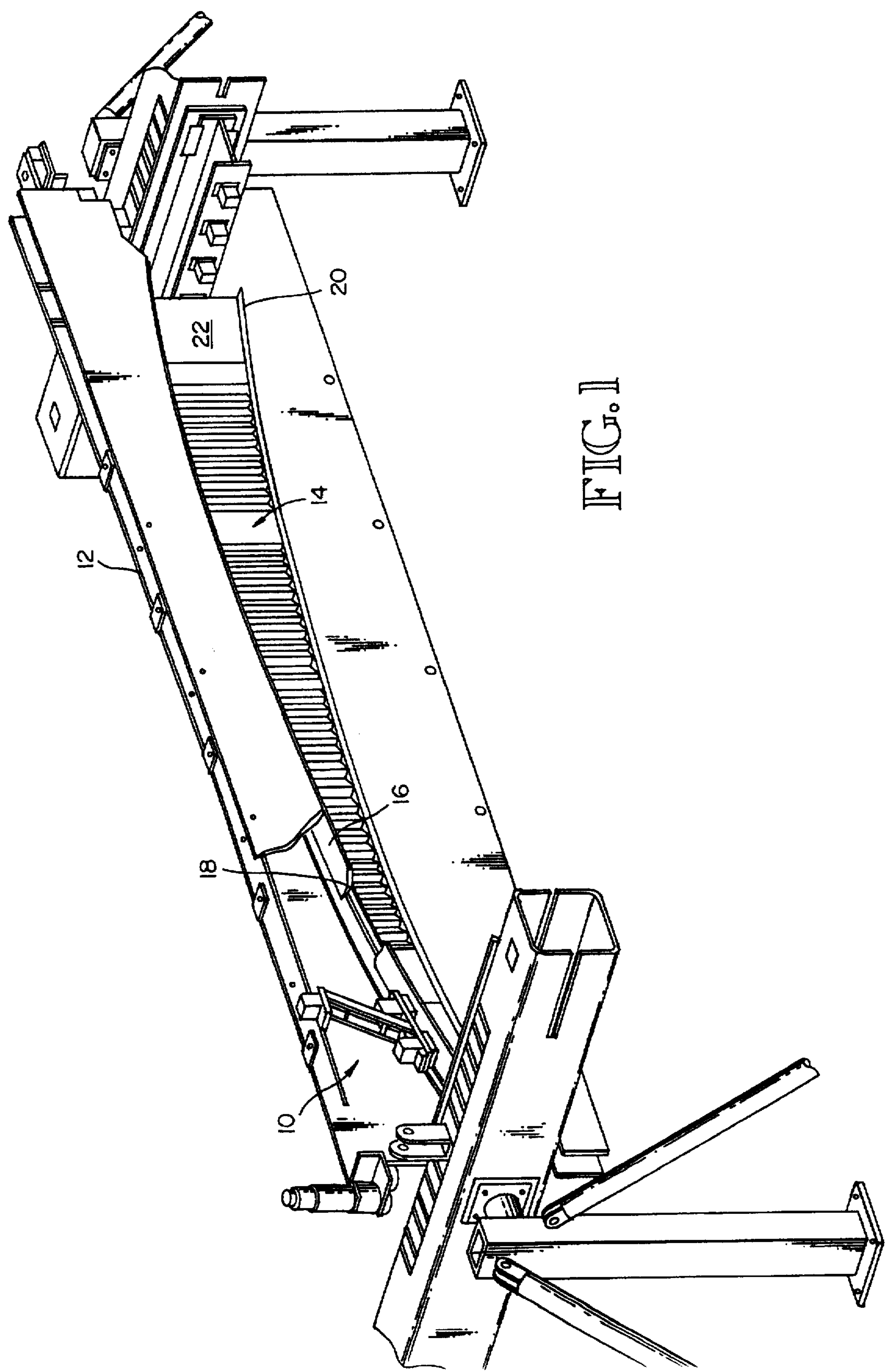
FIG. 1 is a perspective view of a thermoplastic welding apparatus.

Turning now to FIG. 1 a thermoplastic welding head 10 is supported on tooling headers 12 over thermoplastic composite parts to be fusion bonded together. The parts, in this example, include a thermoplastic spar 14 and a thermoplastic wing skin 16, only a small section of which is shown in FIG. 1. The spar 14 is in the form of an "I" beam having a top cap 18, a bottom cap 20, and a connecting web 22. The spar 14 extends lengthwise of the wing of the airplane for which the parts are being assembled, and the wing skin is bonded over the full length and surface area of the spar cap 18 with sufficient strength to resist the tensile and peeling forces the wing will experience in flight.

A conductive susceptor (generally a copper mesh having tailored longitudinal and transverse impedance to achieve uniform heating) encapsulated in a thermoplastic resin is inserted between the spar cap 18 and the wing skin 16. Typically the resin is the same or a slightly lower melting temperature formulation of the same thermoplastic resin of the spar cap 18 and the lower faying surface of the wing skin 16.

The welding head 10 can be any moving coil apparatus that is capable of applying pressure during induction heating of the bondline to promote fusion and after heating for a period sufficient for the resin to cool and harden in its bonded condition. One suitable welding head is disclosed in an application by Karl Hansen entitled "Conformal Skate for Induction Welding," U.S. Pat. No. 5,635,054, which we also incorporate by reference. A preferred welding apparatus includes an induction coil for inducing eddy currents in the susceptor. The eddy currents heat the susceptor by electrical resistance heating and soften or melt the thermoplastic resin in the faying surfaces of the parts so it flows inter diffuses, and fuses together with softened resin of the wing skin and spar cap upon cooling. Two suitable induction coils are described U.S. Pat. No. 5,444,220 by Hansen and Weisberg entitled "Asymmetric Work Coil for Induction Welding," and U.S. Pat. No. 5,313,037, which we incorporate by reference. The coil shown in the '037 patent provides zero eddy current at the center with the current density increasing toward the edges. Use of a tailored susceptor is desirable to counterbalance the nonuniform eddy current density that the coil produces from centerline to edge to achieve uniform heating, and such a susceptor is disclosed in U.S. Pat. No. 5,500,511 entitled "Tailored Susceptors for Induction Thermoplastic Welding," by Karl A. Hansen and C. David Lunden. A selvaged susceptor designed especially for use with the asymmetric induction coil is described in U.S. Pat. No. 5,508,496 by Hansen and Weisberg.

The induction work coil is mounted in the welding head in the center of a lower frame which is pinned to a link connecting the lower frame to an upper frame. The upper frame is pulled by a motive apparatus including a stepper motor driving a drive sprocket and a chain loop through a reduction gear unit. A pair of camroll bearings projects from both sides of the lower frame into cam grooves milled into the inside surfaces of the headers to guide and support the lower frame. A similar set of camroll bearings projects outward from the upper frame into a straight cam groove to guide the upper frame as it is pulled by the chain loop from one end of the wing skin to the other.

The process of welding the wing skin to the spar cap begin with assembling the parts together with the susceptor interposed between the faying surfaces of the parts. In the case of a wing box, this involves attaching the susceptor to the outer surfaces of the spar caps and then sandwiching the spars between the upper and lower wing skins. The parts are held in position and squeezed together by a force exerted by a pair of air bearing pads to which air under pressure is delivered by way of air lines and distributed to the air bearing pressure pads by separate air lines. The air to the pads reduces the frictional drag on the pressure pads on the top surface of the wing skin and helps to cool the pans after the coil has passed. The induction work coil is pulled along the intended bondline over the outer surface of the two wing skins in alignment with the susceptors while producing an alternating magnetic field which projects thorough the wing skins and around the susceptor, generating eddy currents in the susceptor. The eddy currents induced by the magnetic filed are of sufficient amperage to heat the susceptor, raising the temperature of the thermoplastic material in the faying surfaces to its softening or melting temperature. After the first pass of the welding head, the process is repeated three or more times, increasing the power to the coil after the second pass and, if desired, increasing the pressure exerted by air cylinders on the pressure pads.

The bond strength improves with repetitions of the welding passes of the welding head over the same bondline. This phenomenon was discovered fortuitously and was investigated in detail after it was identified. We found that the effect of multiple passes of the induction coil serves to create the optimal conditions for achieving a fusion bond with the desired characteristics of continuity over the entire bondline, and substantial molecular inter diffusion of the materials in the laying surfaces to produce a bondline of high pull-off strength with the complete or nearly complete absence of voids.

The mechanisms for achieving a fusion bond include intimate contact and "healing." Intimate contact of the two faying surfaces is a function of force exerted on the parts to squeeze them together, and temperature-dependent viscosity. The force exerted on the parts is distributed over a certain surface area as interfacial pressure tending to bring the faying surfaces together, and the viscosity of the surface material is manifested by the tendency of high spots in the surface to yield of flow so that low spots in the two surfaces can come together. "Healing" is partly a process in which molten or soften materials flow together and blend where they come into contact, and partly a process of molecular penetration of the polymer chains in the material of one surface into the molecular matrix of the material in the other faying surface. The average penetration distance of the polymer chains, without the beneficial mixing effect achieved by flowing the materials in the faying surfaces, increases as a quarter power of time.

Objective and easily made observations of a bondline that are indicative of the quality of the bond are reduction in bondline thickness, improved ratio of bonded unbonded surface area in the bondline (or expressed conversely, a reduction of the amount of unbonded surface area in the bondline), and improved pass-through of a bonding resin through the interstices of the susceptor. These factors are easily measured by examining the welded part and then pull testing short sections to destruction, which also provides direct bond strength data.

Irregularities such as hollows, depressions and asperites in the faying surfaces of the parts, and other deviations from perfect flatness can interfere with and prevent continuous intimate contact along the full surfaces of the parts where bonding is intended. These deviations from perfect flatness include small scale surface features such as asperites, depressions or hollows, scratches and bumps, and also large scale features such as waviness in the direction of the major length dimension, twist about the longitudinal axis, dishing or sagging of "I" beam flanges, and warping such as humping or bowing in the longitudinal direction. The structural susceptor is particularly suited for dealing with these problems.

2. The Structural Susceptor

The structural susceptor includes a conventional susceptor 100 and a plurality of loosely bonded plies of thermoplastic resin 102 and fiber reinforcement 104 sandwiching the conventional susceptor. Either the tailored susceptor of U.S. Pat. No. 5,500,511 or the selvaged susceptor of U.S. Pat. No. 5,508,496 can be used as well as other susceptors known in the art.

The susceptor usually is fabricated from a copper foil having a thickness of from 0.003–0.010 in (0.075–0.25 mm). Any material having good electrical conductivity and high magnetic permeability (so that it is a good susceptor)

may be used. Our susceptor has a pattern of openings (usually diamonds) 140 (FIG. 4) made by conventional methods such as etching, stamping, or expansion. The foil can also be nickel, nickel-coated copper, cobalt/iron alloys, iron-nickel alloys, or another suitable metals or alloys having an appreciable magnetic permeability up to the operating temperature of interest. We use diamond shapes with uniform line widths of about 7 mils (0.18 mm) to define the peripheries of the diamonds. The diamonds can have L/W ratios less than or equal to 1.0 in our selvaged susceptor where we are interested in influencing the eddy currents to run transversely into the solid edge strips. If we use a cup coil of the '037 patent and a tailored susceptor, we want L/W to be greater than one so that the longitudinal impedance is less the impedance and the eddy currents rum longitudinally although the coil drives them transversely. Other shapes can be used for the openings to create a foil that has a uniform impedance or whatever desired ratio in the longitudinal and transverse directions.

Figure 5:
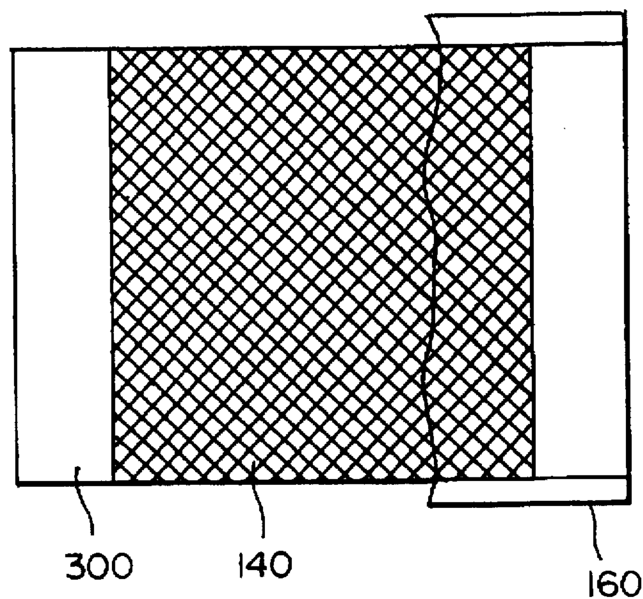
FIG. 5 is a plan view of a typical selvaged susceptor which can be used as the center of a structural susceptor by loosely bonding plies of reinforcing fiber and thermoplastic resin on the top and bottom surfaces.

The ratio of length to width (L/W) for the selvaged susceptor affects the susceptor's heating and the quality of the weld. Having higher longitudinal impedance influences the induced current to flow transversely in the path of least resistance toward the selvaged edges 300 (FIG. 5). Once in the edges, the conductivity is the highest and the current density the lowest, so the eddies can turn easily.

We modify the edges of the selvaged susceptor (FIG. 5) to adjust the current density. We seek to accommodate a higher current density at the edges so that the edges will produce a proportionately lower eddy current for a constant field strength. In this way, the coil will heat the edges uniformly with the center. The selvaged susceptor counters the nonlinearities that naturally occur with cup core coils. It provides an area outside the bondline when using the asymmetric coil so that the eddy currents can turn and proceed transversely back across the open mesh of the selvaged susceptor.

Our preferred selvaged susceptor has solid copper selvage strips 300, devoid of openings, to maximize the current density in the edge region while the center has the characteristic diamond pattern of openings. Neither folding nor compressing in the edge region which we tried with our tailored susceptor produces a high enough current density to produce the uniform heating we need with our cup core coil to produce reliable, reproducible, quality thermoplastics welds. Using solid selvage edge strips is better, especially at the beginning and end of a weld run where the dwell of the coil can introduce thermal discontinuities that we avoid when we are moving the coil slowly along the weld seam. Using an asymmetric coil which has an "A" winding on one pole of the "C" core and a "B" winding of opposite helical twist on the other pole, we can achieve relatively uniform, intense heating between the poles with relatively insignificant heating outside the poles, at least in the region training the moving coil. Only one coil winding is active at a time. The asymmetric coil allows us to heat uniformly under the coil to the edges of susceptor on the ribs without remelting or overheating the welded area under the abutting spar. The asymmetry provided by two windings, only one being active at a time, allows us to travel in either direction with start-up or finish without significant heating under the spar. Thermal discontinuities produce welds of differing characteristics which can, from the uncertainty of quality, cause designers to question the integrity of the structure. Using solid edge selvage strips, we have minimized thermal discontinuities (especially at the start or finish of the weld) and produce better welds more consistently. The edge strips are in the order of 1.0–15.0 ram, and usually are outside the bondline. That is, the open center portion is essentially the same width as the cap of the spar or rib. Welding does not occur under the edge strips and the strips can be removed after welding is finished.

Our goal is to produce aircraft structure that eliminates fasteners. Welded structure will be far less expensive because welding eliminates the labor to drill holes accurately and to inspect the fasteners after installation. We also will avoid other problems that fasteners introduce, such as sealing around the fastener and the holes, mismatch of materials, and arcing from the fasteners. To replace the fasteners, however, requires confidence that the welds are uniform and consistent, because a failure at any weak point in the weld could lead to catastrophic unzipping of the entire welded structure. One of the most important problems is temperature uniformity along the bondline to achieve uniform and complete melt and cure of the resin.

As mentioned earlier, we embed the foil in the resin 160 (FIG. 5) to create the susceptor and to simplify the welding process. Making a susceptor (i.e. the foil/resin tape) eliminates the steps of applying separate layers of resin between the respective elements in a composite-susceptor-composite assembly. It also ensures that there will always be adequate resin proximate the susceptor and essentially uniform resin thickness across the welding bondline. Our typical tape is about 2 inches wide with K3A Avimid resin (an aromatic polyimide), although we can use PEEK, PEKK, PES, or any other thermoplastic. The resin must be compatible with the matrix resin in the composite and generally is the same resin as the matrix resin when welding thermoplastic composites. For welding thermoset composites, the resin will likely be a comparable thermoplastic formulation of the matrix resin in the composites or a compatible resin.

With our tailored susceptor and the cup coil of '037, we have different considerations. The power (P) is a function of the current (J) and the resistance (i.e. impedance) (R): $P=(J^2)(R)$. So, if the eddy current doubles, to maintain P constant, the impedance must decrease to one-fourth its initial value. To maintain the power constant, when using the cup coil, the impedance must be much lower at the edges than it is in the center of the susceptor.

We modify the edges of the tailored susceptor to adjust the current density so that the current density can be higher and thereby produce a proportionately higher eddy current without producing a higher temperature. While the current is higher the impedance is lower on the edges (there is more metal to carry the current), and the net effect (i.e., $(J^2)(R)$ will be substantially uniform heating.

Now, the edge treatment would produce lower temperatures at the edges than in the center if the magnetic field strength were constant across the susceptor. With our coil, however, the field strength is highest at the edges. Therefore, the two elements (coil and susceptor) work together to yield a relatively uniform temperature in the bondline.

We have tried several ways to control the impedance to achieve more uniform heating than conventional susceptors provide. First, we adjust the aspect ratio of diamond-shape openings in the tailored/susceptor (i.e. the ratio of the length to the width of the openings; L/W) to create a longitudinal impedance lower than the transverse impedance. Second, we fold the susceptor near the edges to produce thin strips of double thickness where the additional mass and surface area of the susceptor in these edge strips reduces the current density, which is a complementary measure of the impedance. Third, we compress or crimp openings in regions near the edge to alter the aspect ratio and to increase the ratio of the longitudinal conductivity relative to the transverse conductivity.

In the center of the susceptor, the current that we induce with the coil has many paths in which it can flow. Near the edge, however, the choices decrease, in essence, unless we create additional current paths artificially. The coil is trying to induce a current of the largest magnitude near the edges. Therefore, we introduce, in one embodiment of the present invention, a susceptor with nonlinear impedance to counterbalance the current and to achieve relatively uniform heating.

The ratio of the length (L) to the width (W) of the openings is critical to achieving uniform heating in a foil of uniform thickness having openings of only one size and shape and uniform line widths. With a susceptor having a uniform distribution of openings of aspect ratio greater than one, crowding of the current along the edge of the susceptor is reduced and the temperature is more uniform even though the absolute impedance at the edges and in the center is equal. The higher aspect ratio provides an impedance for the susceptor which dominates the power equation so the effect of eddy current changes is masked.

The longitudinal conductivity is higher than the transverse conductivity principally because the path length for the current to flow longitudinally is more direct and consequently shorter than that required for transverse flow.

The tailored susceptor may be folded over on itself near the edge to form a double thick region at the edge. Of course, double thickness could simply be manufactured into the susceptor. The tailored susceptor could be slightly inwardly along its edges to form a region where the aspect ratio (L/W) is higher than in the center portion and the density of metal ($gm/cm^3$) is increased over the center portion. Both factors reduce the current densities near the edges so heating at the edges is reduced. Again, the combined effect with the higher field strength results in a more uniform temperature in the bondline.

The edge techniques can be combined to achieve the desired tailoring. Instead of compressing the susceptor to form the edge region, we can form the susceptor with a grading in the openings (i.e. higher aspect ratios toward the edge) such as square diamonds in the center and elongated diamonds in the edge region. The grading can be in distinct steps or can be gradual across the width.

To form the structural susceptor, then, we take a conventional (tailored or selvaged) susceptor 100 and loosely bond reinforcing fiber 104 and thermoplastic films 102 in alternating layers symmetrically on both sides as shown in FIG. 2. The reinforcing fiber preferably is woven fiberglass, because fiberglass has a higher coefficient of thermal expansion than carbon fibers so that the fiberglass reinforcement provides better relief of the residual tensile strain otherwise present in the weld. The thermoplastic films are preferably the same resin as that used to embed the metal foil and to fabricate the laminates. Sheet thicknesses for these films are usually about 0.001–0.002 in (0.025–0.050 mm). The woven fibers are preferably oriented perpendicular and parallel to the longitudinal axis of the weld.

The structural susceptor is generally loosely bonded together by heat or pressure or both, but could be of essentially unitary construction if desired. Being loosely bonded helps in gap filling as we will next explain. We use at least two layers of fiber and thermoplastic on each side of the susceptor, but the absolute number is not critical. We have successfully fabricated susceptors with 26 plies of 106 style fiberglass. We have also prepared peelable susceptors by preplying and consolidating single plies of 108 style fiberglass with K3A films (about 0.015±0.005 in thick) followed by a low pressure, moderate temperature heat tacking to adhere the plies to either side of the copper/resin susceptor tape. We have tested four different styles of fiberglass and achieved similar results with each, so we do not believe that the type or style of fiberglass is critical.

The fiber alleviates residual tensile strain in the weld, and suppresses cracking if the fiber volume is at least about 30%. The thermoplastic ensures a resin rich weld.

3. Gap Filling

To achieve a high quality induction weld, the parts being joined must first come into intimate contact and then the interface must be healed by the intermolecular diffusion of polymer chains across the interface. Intimate contact will be achieved along the length of the weld when the parts being joined have no gap between them. Since typical manufacturing tolerances associated with pan fabrication and assembly can result in gaps as large as 0.120 inch, there needs to be a method for reducing the gap between the details being joined.

Using a multipass welding process, parts with a preweld gap of up to 0.020 inch have been successfully welded. To achieve a preweld gap of less than 0.020 inch it has been necessary to perform a detailed surface mapping operation on both faying surfaces and a subsequent machining operation on one of the surfaces. Currently plies of carbon fiber reinforced composite have been added to the structure to be sacrificially machined to reduce the gap. This machined surface no longer provides a resin rich surface for the welding process resulting in a significant reduction in weld performance.

When parts with surface irregularities in their faying surfaces are brought together with a susceptor between them, the first pass of the welding head heats the susceptor to about the melting temperature of the thermoplastic faying surfaces of the parts. The resin encapsulating the susceptor melts and resin in contact with the susceptor/resin pack also melts, and the pressure exerted on the wing skin in the vicinity of the work coil presses the faying surfaces closer together and extrudes excess resin from the tops of the projecting surface irregularities. However, surface irregularities upstream and downstream of the zone being heated by the coil remain uneven and continue to interfere with perfect intimate contact by the full surface areas of the laying surface, and the stiffness of the top part limits the vertical excursion that the top part can make into contact with a large scale depression in the underlying pan. Some of the projecting surface irregularities in the heated zone are melted and flattened in this first pass and the parts are now welded together with some percentage of the bond line faying surfaces fusion bonded together. Some small scale irregularities may remain, preventing full intimate contact of the surfaces, and a larger percentage of the large scale irregularities may still remain, also preventing some contact.

During the second and subsequent passes of the welding head, the resin in contact with the susceptor is again heated to the melting or softening temperature by the heated susceptor, and the pressure exerted by the pressure pads on the welding head presses the faying surfaces into more intimate contact, extruding additional thermoplastic from the bondline. The projections above the plane of perfect flatness on the parts are reduced further, and the hollows are partially filled in by melted or softened resin melted off the high points of the surface irregularities.

As mentioned earlier, the susceptor foil 140 is embedded in thermoplastic resin 160 to simplify the welding process. Making a tape of the susceptor encapsulated in a thermoplastic which is the same or compatible with the thermoplastic on the faying surfaces of the parts to be welded together ruggedizes the otherwise fragile susceptor and ensures an adequate quantity of thermoplastic around the susceptor. It also improves the heat transfer characteristics of the susceptor to the faying surfaces of the two thermoplastic parts.

Figure 6:
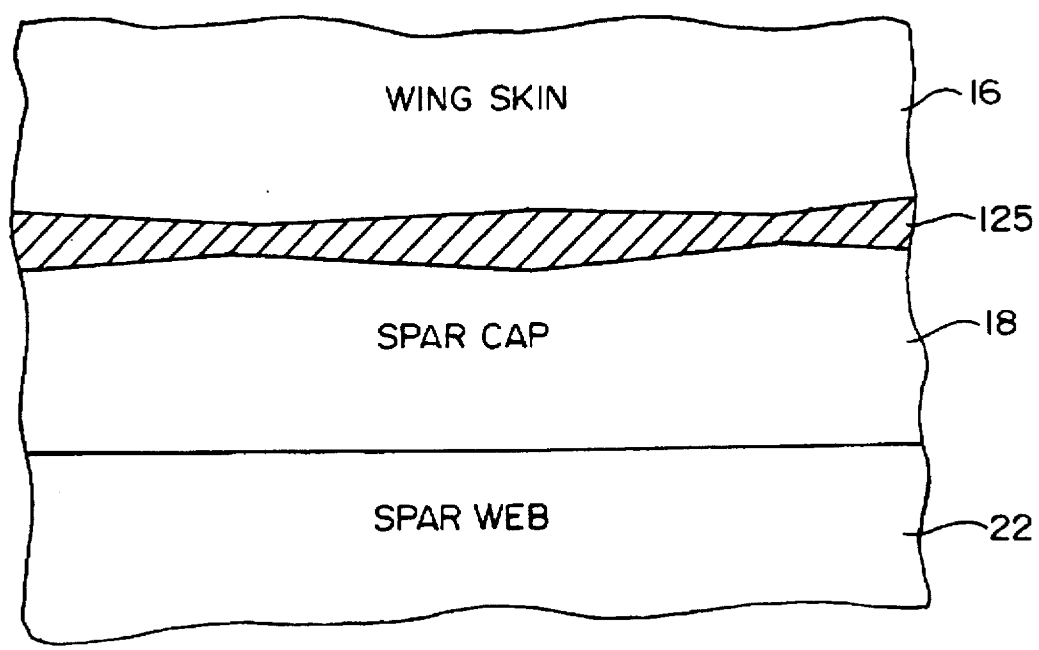
FIG. 6 shows a typical weld using the structural susceptor and gap filling method of the present invention.

The structural susceptor can fill the gap because it can be trimmed or tailored by peeling away portions 115 of the overlying thermoplastic and fiber as shown in FIG. 3. We measure the gap with verifilm or another suitable method and tailor the structural susceptor to complement the gap. As shown in FIG. 3, we cut peaks and valleys in the susceptor, differing the number of plies to match the gap. In doing so, we eliminate the need for machining the sacrificial plies. We can eliminate their added cost and weight and can speed the assembly. We also have a resin rich layer at the faying surfaces which assures a higher quality weld. The completed weld 125 is depicted in FIG. 6.

While described with respect to a moving coil operation, the present invention is applicable to fixed coil welding operations that use an embedded susceptor. In such operations, particularly those using Boeing's induction heating workcell as described in, among other, U.S. Pat. No. 5.530,227 by Matsen et al. entitled "A Method and Apparatus for Consolidating Organic Metric Composites Using Induction Heating" (which we incorporate by reference), the susceptor typically is a thin and narrow, solid copper strip rather than a mesh, because the fixed solenoid coil induces eddy currents to run longitudinally. Such a welding operation is described in U.S. Pat. No. 5,681,422 by Matsen et al. entitled "Thermoplastic Welding of Organic Resin Composites Using a Fixed Coil Induction Heater, which we also incorporate by reference.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

We claim:

1. A method for thermoplastic welding to join two fiber-reinforced composite laminates with a susceptor encased in a thermoplastic resin, comprising the steps of:

(a) positioning at least two laminates to define a bondline;

(b) positioning a susceptor along the bondline;

(c) adding fiber reinforcement and additional thermoplastic resin where necessary to fill gaps along the bondline between the laminates and the susceptor; to fill gap, thereby eliminating resin deficient regions otherwise occurring; and (d) heating the susceptor to melt the resin and to form a thermoplastic weld between the laminates.

2. A product obtained by the process of claim 1.

3. A method for filling gaps along a bondline between faying surfaces of fiber-reinforced resin composite laminates prior to their joined with a thermoplastic weld, the weld containing a susceptor having metal sheet encased in fiber-reinforced, thermoplastic resin, the method comprising the steps of:

(a) adjusting the thickness, number of plies, or both of the fiber-reinforced, thermoplastic resin along the bondline to fill gaps between the laminates, and (b) welding the laminates by heating the susceptor to melt the thermoplastic resin.

4. A product obtained by the process of claim 1.

5. A method for thermoplastic welding to join at least two prefabricated resin composite laminates using a susceptor along a bondline, the susceptor being capable of heating to a temperature at which a welding resin in the bondline melts, comprising the steps of:

(a) positioning the laminates to define the bondline;

(b) identifying the gap profile between the positioned laminates along the bondline;

(c) tailoring the susceptor by peeling at least one filler layer associated with a metal sheet in the susceptor so that the susceptor profile substantially complements the gap profile;

(d) positioning the tailored susceptor along the bondline;

(e) welding the laminates together along the bondline by inducing eddy currents in the metal sheet of the susceptor to heat the bondline to at least the melting temperature, wherein the susceptor comprises a metal film embedded in a thermoplastic resin and a plurality of additional filler layers sandwiching the metal film, each filler layer including a thermoplastic resin film and a fiber reinforcement.

6. A product obtained by the process of claim 5.

7. The product of claim 6 being a wingskin welded to a spar.

8. The product of claim 7 wherein the wingskin and spar are reinforced with carbon fiber and wherein the fiber reinforcement in the filler layer is fiberglass.

* * * * *